July 21, 1964
T. R. BOYD
3,141,487
ROTARY FASTENER
Filed Nov. 27, 1961
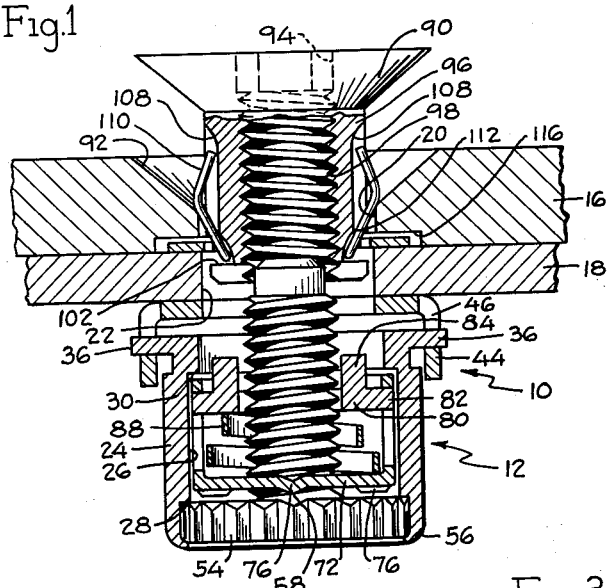
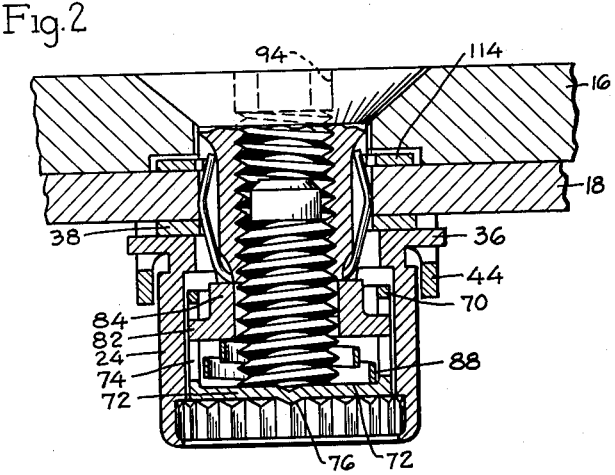
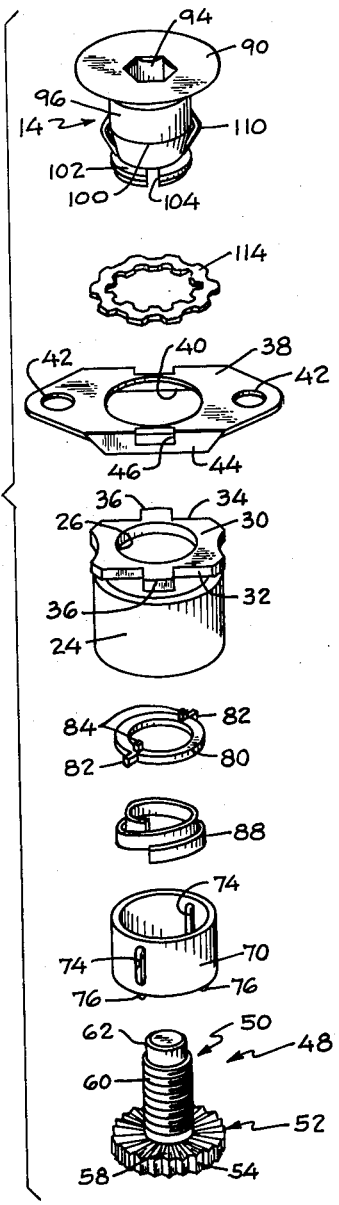
INVENTOR.
Thomas R. Boyd
BY
ATT'Y.

3,141,487
ROTARY FASTENER

Thomas R. Boyd, Rolling Hills Estates, Calif., assignor to Illinois Tool Works Inc., Chicago, Ill., a corporation of Delaware
Filed Nov. 27, 1961, Ser. No. 154,980
4 Claims. (Cl. 151—13)

This invention relates to a fastening unit.

More particularly, it relates to what is known in the industry as a cowl fastener. Specifically, the subject of the present invention is a fastener of the type utilized to secure stress bearing panel members to structural frame members and generally bears the descriptive name of a high-shear cowl fastener.

Fasteners of this type are utilized in the aircraft and missile industry for securing outer plates, which must be removable to provide access to internal parts for inspection or repair and maintenance, to structural members. Such a fastener must be capable of being readily removed by a simple rotary motion and further must progress from the fastened position to the removed position in as few turns as possible. This latter requirement is primarily based on the fact that any given panel will carry a multiplicity of such fasteners and, hence, the individual fastener must be readily removed to permit removal of all of the fasteners in the shortest possible time. It is obvious that because of the tremendous stresses imposed upon structural panel members that the critical loads involved must be supported by a rugged design of fastener. Similarly, simplicity in construction of the fastener is of prime importance to forestall mechanical failure thereof and to permit economical fabrication of the fastener in view of the multiplicity of fasteners required.

A basic problem confronted by the industry utilizing fasteners of this type is the problem of vibration. A suitable fastener must resist vibration forces constantly and if possible not be affected by them. Some fasteners are definitely known to be affected by vibrational forces and are subject to retrograde motion of the fastening elements resulting in loosening of strategic component parts and subsequent failure thereof.

A primary object of this invention, therefore, is to provide a high shear cowl fastener adapted to structurally withstand the high stress force imposed on it in its use. A further object of the invention is to provide suitable locking means adapted to prevent unauthorized retrograde movement of the fastener. A further object of the invention is to provide a simple fastener having a minimum number of parts which can be economically fabricated.

These and other objects of the invention will become more readily apparent when the specification is read in combination with the accompanying drawing wherein:

FIG. 1 is a partial section in elevation of an embodiment of the present invention shown in assembled relation to the panels prior to engagement of the parts;

FIG. 2 is a partial section in elevation of the device shown in FIG. 1 in engaged position; and FIG. 3 is an exploded perspective view of the various components making up the fastener which is the subject of this invention prior to subassembly and assembly to the workpiece.

The cowl fastener 10 includes a receptacle assembly 12 and a grommet or tube nut assembly 14 which are adapted to telescope through coincident apertures 20 and 22 respectively, and fasten panels 16 and 18.

The receptacle assembly 12 as seen in the drawing includes a substantially cylindrical case 24 having an axially extending bore 26 which is counterbored to provide a pair of spaced shoulders 28 and 30 respectively. At its upper end the case 24 is provided with a laterally extending flange 30 having two opposed flat sides 32 and 34 for purposes set forth hereinafter. Extending generally centrally, from the opposed flat sides 32 and 34 are a pair of lugs or arms 36.

A cage 38 having a central aperture 40 is suitably attached to the lower panel 18 by screws or rivets, not shown, passing through end apertures 42 into sheet 18 with aperture 40 in register with aperture 22. Depending from opposite sides of cage 38 are a pair of flanges 44 having aperture means 46 positioned adjacent the under planar surface of cage 38. Apertures 46 are horizontally and vertically dimensioned so as to be greater than lugs 36 to permit limited movement of the case 34 in lateral and vertical relation to aperture 22 in sheet 18, for purposes set forth hereinafter. It should be noted that the assembled parts in FIG. 1 are viewed generally along the axis of exploded view of FIG. 3 in a direction looking to the left in the drawing.

A multiple thread high lead screw 48 having a shank 50 and a head 52 is telescoped through the lower end of case 24 until head 52 is brought to bear against shoulder 28. Head 52, around its outer periphery, is knurled or suitably roughened as at 54 to cooperate with case 24 to prevent relative rotation between the two parts. The diameter of head 52 can be slightly larger than the case at its lower end to provide an interference fit for the same purpose. To prevent axial movement of the head relative to the case, in the preferred embodiment, the bottom free end of case 24 is rolled over as at 56 to maintain the head in abutting relation with shoulder 28. Other suitable means for retention will be apparent to those skilled in the art.

On the upper surface of head 52 there is provided a plurality of lateral extending grooves 58 or other suitable protuberance means for the purpose best set forth hereinafter. In the preferred embodiment, for purposes of economy, these grooves and the grooved knurls can be cold-heated during the fabrication of the screw. The shank 50 has a multiple thread high lead threaded section 60 extending from the head towards the tip and a pilot portion 62 adjacent the free end of the shank. Pilot portion 62 is chamfered at its extremity for purposes best set forth hereinafter.

A cup-like member 70 having an apertured base 72 and a pair of vertical slots 74 in opposite wall portions is telescopically associated with and rotatably encircles the shank 50. By a controlled diameter it is axially captured between the grooved head 52 and shoulder 30. A plurality of protuberances 76 are spaced circumferentially around and project from the outer surface of base 72. Protuberances 76 are complementary to the grooves 58 in the head of the screw. In the present embodiment these protuberances are positioned in quadrature. A key ring or driving means 80 is telescoped with the shank and provided with a pair of laterally extending lugs 82 adapted to be accepted within and axially movable within slots 74 of the cup 70. A second pair of vertical lugs 84 extend axially upwardly from the ring 80. A spring 88 encircles the shank 50 and resiliently biases the lateral lugs 82 of ring 80 upwardly against the upper end of slots 74 by reaction against the base 72. The entire locking assembly of cup 70, ring 80 and spring 88 are freely rotatable about the shank 50 until the protuberances 76 are in engagement with the grooves 58.

The grommet or tube nut assembly 14 is associated with aperture 20 in sheet 16. It has a frusto-conical head 90 adapted to be cooperatively received within counterbore 92 as is well known in the art. Driving means 94, in the present instance, a hex socket, are provided in the head. Other suitable head forms and driving means are well known in the art.

Extending downwardly from head 90 is a substantially cylindrical or tubular body 96 having a central bore 98 extending substantially throughout its entire length, stopping short of the driving means, and is internally threaded complementary to screw 48. The body 96 is tapered at its lower end with the taper commencing at an intermediate circumferential point 100 and continuing to a point short of the end to form the flange shoulder 102 for purposes best set forth hereinafter. The shoulder end of the grommet is transversely slotted as at 104 and is adapted to cooperate with lugs 84 as shown hereinafter. Body 96 is further provided with a pair of axially extending grooves 108 of varying depth. For purposes of clarity and illustration, the grooves 108 have been rotated 90° in FIGS. 1 and 2 from their normal unviewable position in FIG. 3. Positioned internally of each of grooves 108 is a resilient bent spring member 110 suitably fastened, as by brazing or peening at the lower end of body 96. They are adapted to rest against the fulcrum point 112 in the varying depth slots 108 and normally urged beyond the periphery of body 96. The function and purpose of the groove 108 and spring 110 is more clearly disclosed in my copending application for U.S. Letters Patent Serial No. 791,464, filed February 5, 1959.

To axially retain the grommet assembly 14 within aperture 20 a suitable retaining ring 114 being laterally resilient encircles the grommet, after it has been telescopically associated with aperture 20. It prevents total axial withdrawal of the grommet assembly from panel 16 when the ring 114 rides down the tapered portion into engagement with the flanged shoulder 102. To permit flush mounting of the panels, panel 16 or panel 18, as the designer may desire, is counterbored as at 116 to accommodate retainer ring 114.

In the operation of the illustrative embodiment of this invention, suitable driving means, not shown, are inserted in the hex bore 94 and the grommet 14 is axially depressed and rotated over the pilot 62 end of the shank 50. The chamfered end of the pilot in cooperation with the limited movement of lateral lugs 36 within apertures 46 will accommodate, within limits, a misalignment of the apertures 20 and 22. The grommet 14 is rotated along the threaded shank with the slots 104 in engagement with the vertical lugs 84. Rotary motion is transposed through the key ring 80 and its lateral lugs 82 to the cup 70. The biasing spring 88 forces the base 72 with its accompanying protuberanes 76 into engagement with the grooves 58 of head 52. This draws the case 24 vertically as viewed in FIG. 2 into engagement with the under side of cage 38 resulting in a drawing of panel 18 towards panel 16. It is apparent that cup 70 will act against spring 88, during the rotational motion of the interlocked units to permit protuberances 76 to ride up over the high points and become seated in the complementary grooves 58 of the screw head. Unauthorized retrograde motion of the grommet relative to the screw shank and receptacle is prevented by this interlocked arrangement between the biased cup 70 acting through the key ring 80 to the grommet 14.

Intentional retrograde rotary motion of the grommet 14 through driving means 94 results in a jacking of the grommet relative to the panels. As the retainer ring 114 rides down the tapered surface during the jacking out of the grommet 14 the spring pressure against the tapered surface by ring 114 aids in the ejection. In addition, the spring members 110 which are bent to provide shoulders in the middle, react against the fulcrum point 112 and the side walls of counterbore hole 120 to retain the grommet in ejected position. A distinct advantage of this fastener is the fact that the only projection below panel 16 is the shoulder flange 102 of grommet 14. This permits the use of this fastener in curved workpieces having a very small radius of curvature.

Thus, the disclosed embodiment of this invention is a simple device capable of being economically fabricated and capable of withstanding the shear forces generated in the work panel.

Other embodiments and modifications will be apparent to those skilled in the art and it is my intent that I would be limited only by the appended claims.

I claim:

1. A stressed panel fastener adapted to fasten a pair of apertured panels comprising a grommet assembly and a receptacle assembly wherein said grommet has a head and a body, said head being frusto-conical in shape and having driving means at its upper end, said body having a generally cylindrical portion depending from said head and an inwardly tapered portion extending from a point intermediate the length of the body, towards the opposite end, a circumferential laterally extending flange means terminating the tapered portion adjacent said opposite end, a threaded bore extending axially a substantial portion of said body and opening through said opposite end, a transverse diametral slot traversing said flange, resilient retaining means encircling said grommet body and adapted to cooperate with said flange and head to movably retain said grommet assembly in one of said apertured panels, said receptacle assembly positioned in register with the aperture in the second panel including a substantially cylindrical open ended receptacle having a pair of radially dissimilar shoulder means axially spaced within its bore, a headed screw having its stud portion complementary to the bore of said grommet extending coaxially within said receptacle, the head of said screw having a diameter such that it bottoms against one of said shoulder means adjacent one end of said receptacle, the wall of said receptacle at said one end being deformed to non-rotatably retain said screw head between the deformation and said shoulder means, a plurality of protuberance means on the surface of said screw head facing the interior of said receptacle, a cylindrical cup shaped means having an apertured bottom, said cup being telescoped within said receptacle and be rotatably and axially movable along the stud of said screw, the diameter of said cup shaped means being greater than the second and less than the first of said shoulder means whereby said cup shaped means is rotatably captured for limited axial movement between said second shoulder means and the head of said screw, said cup means having at least one means adapted to cooperate with said protuberance means on said head, a pair of axially extending oppositely disposed slots in the wall of said cup shaped means, a ring member freely encircling said stud positioned within said cup and having two pairs of oppositely disposed lugs, one pair of lugs extending radially outwardly in opposite directions from said ring and being accepted in and being axially movable within the slots in said cup shaped means, the second pair of lugs both extending axially towards the open end of said cup shaped means and adapted to be cooperable with the transverse slot in the end of said grommet, resilient means encircling said stud and acting against the bottom wall of said cup and said ring to urge them apart, apertured means for retaining said receptacle assembly in register with an aperture in said second panel whereby said threaded grommet when rotatably engaged with said screw will draw the two panels into fastened relation and said grommet slots engaged with said second pair of ring lugs and acting through the resilient means forces the means on the bottom of the cup into engagement with the protuberance means on said head to prevent unintentional retrograde relative movement between the threaded members.

2. High shear fastening means for attaching two apertured panels including a threaded tube nut adapted to traverse an aperture in one of said panels and receptacle means mounted in concentric relation to the aperture in said second panel and adapted to accept said tube nut, said tube nut having a conical head for complemental seating in a counterbore in the first mentioned panel, a tubular body portion extending downwardly from said head and being internally threaded for a substantial portion of its extent, said body portion being tapered intermediate its length inwardly toward the free end opposite said head, a flange extending laterally from said free end adjacent said tapered section, a transverse slot in the free end of said tube nut, means mounted on said tube nut and adapted to retain the tube nut in the first apertured panel, said receptacle including a case having means at its upper end for retaining said receptacle in adjustable relation relative to the second of said apertured panels, a threaded stud projecting internally of said receptacle with its free end being positioned adjacent and concentric with the aperture in said second panel and adapted to complementally accept said tube nut, protuberance means extending upwardly from base means non-rotatably mounted in the lower end of said receptacle in the same direction as said threaded stud, the other end of said stud having means provided to non-rotatably retain said stud to said base means in said receptacle, locking means comprising a cage rotatably mounted on said threaded stud but axially captured within said receptacle, said cage including a base having upstanding slotted walls, said base having downwardly projecting protuberance means for adjustable interengagement with the non-rotatable protuberance means in the lower end of said receptacle, driving means axially shiftable but non-rotatably mounted within the slotted walls of said base and telescopically assembled with said threaded stud, spring means interposed between said driving means and said base so as to provide a spring bias between the base and said driving means, means extending from said driving means for engagement with the slotted end of said tubular nut whereby rotation of said tubular nut about said threaded stud results in a rotation of said cage about the threaded stud whereby said spring urges the cage base protuberance means into engagement with the protuberances projecting upwardly from the lower end of the receptacle, said protuberance means having a configuration whereby non-intention retrograde movement of said tube nut is prevented but intentional retrograde movement by axial compression of the spring in the cage will permit overriding of the cage protuberance past their opposed member in the base of the receptacle thereby permitting rotation of the tube nut and cage relative to the threaded stud.

3. High shear fastening means for attaching two apertured panels of the type described in claim 2, wherein the spring means interposed between said driving means and said base to provide a spring bias therebetween, comprising a spring in the shape of an Archimedean spiral having the free ends thereof spaced along the axis of the fastener.

4. High shear fastening means for attaching two apertured panels of the type described in claim 2, wherein the means non-rotatably mounted in the lower end of said receptacle having protuberance means thereon to cooperate with protuberance means on the cage consists of an integral head which extends laterally from the end of the threaded stud.

References Cited in the file of this patent
UNITED STATES PATENTS

| | | |
|---|---|---|
| 721,990 | Young | Mar. 3, 1903 |
| 2,377,114 | Tomalis | May 29, 1945 |
| 2,731,058 | Smisko | Jan. 17, 1956 |
| 2,737,222 | Becker | Mar. 6, 1956 |
| 2,991,816 | Harbison | July 11, 1961 |